United States Patent

[11] 3,630,128

| [72] | Inventor | Kiyoshi Kitai<br>Tokyo, Japan |
|---|---|---|
| [21] | Appl. No. | 851,957 |
| [22] | Filed | Aug. 21, 1969 |
| [45] | Patented | Dec. 28, 1971 |
| [73] | Assignee | Kabushiki Kaisha Hattori Tokeiten<br>Tokyo, Japan |
| [32] | Priorities | Aug. 28, 1968 |
| [33] | | Japan |
| [31] | | 43/61205;<br>Aug. 23, 1968, Japan, No. 43/59849 |

[54] AUTOMATIC CHANGEOVER DEVICE TO FLASHLIGHT PHOTOGRAPHY FOR CAMERA OR SHUTTER
11 Claims, 6 Drawing Figs.

[52] U.S. Cl. ................................................... 95/10 C, 95/11.5
[51] Int. Cl. ........................................................ G03b 7/00
[50] Field of Search .......................................... 95/11, 11.5, 10

[56] References Cited
UNITED STATES PATENTS

| 3,282,180 | 11/1966 | Hutchison | 95/11 L |
| 3,307,462 | 3/1967 | Hutchison | 95/11 L |
| 3,374,718 | 3/1968 | Hochreiter | 95/10 C |
| 3,504,604 | 4/1970 | Kitai | 95/10 C |

*Primary Examiner*—Samuel S. Matthews
*Assistant Examiner*—Kenneth C. Hutchison
*Attorneys*—Robert E. Burns and Emmanuel J. Lobato

ABSTRACT: Camera shutter release mechanism automatically changes from daylight exposure to flash exposure when the brightness of the subject to be photographed is below a selected value. However, if the flash device is not in operative condition, no changeover to flash photography is effected regardless of the light value. A pilot lamp indicates the inoperative condition of the flash device.

AUTOMATIC CHANGEOVER DEVICE TO FLASHLIGHT PHOTOGRAPHY FOR CAMERA OR SHUTTER

The present invention relates to the shutter release mechanism of a camera having provision for flash photography and particularly to changeover device for automatically effecting a daylight exposure or a flash exposure according to the brightness of the subject being photographed. If the brightness of the subject is higher than a predetermined value, the exposure is automatically adjusted according to the brightness of the subject. If the brightness of the subject is lower than the predetermined value, the exposure is automatically adjusted for flashlight photography so as to effect a flash exposure by light emission from the flashing device with which the camera is provided.

While changeover devices have been previously proposed, they have had the disadvantages of requiring a relatively high operating force and of being uncertain and unreliable in their operation. The present invention overcomes these disadvantages by providing a changeover member which is selectively coupled to a shutter release member through and intermediate part so as to be operated with the shutter release member when the brightness of the subject being photographed, as determined by a suitable brightness-sensing device, is below a selected value. When, on the other hand, the brightness of the subject is greater than the selected value, the coupling means between the changeover member and the shutter release member is disabled so that a photograph is taken by daylight exposure automatically adjusted to the brightness of the subject.

A further feature of the invention is that even when the brightness of the subject is below the selected value, the changeover to flash photography is effected only if the flashing device of the camera is in operating condition for emitting a flash of light. If the flashing device is not in proper operating condition, the photograph is taken by daylight exposure which is automatically adjusted to compensate for the lower brightness level. An indicating device is preferably provided to give an indication when the flashing device is out of order.

The objects and advantages of the invention will be more fully understood from the following description in conjunction with the accompanying drawings in which.

Figure 1:
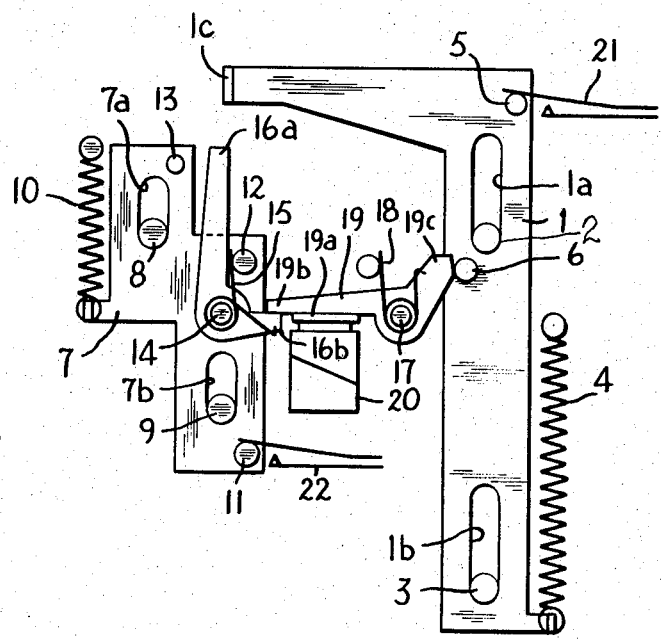
FIG. 1 is a schematic plan of shutter release mechanism in accordance with the invention shown in the state prior to a release operation.
Figure 2:
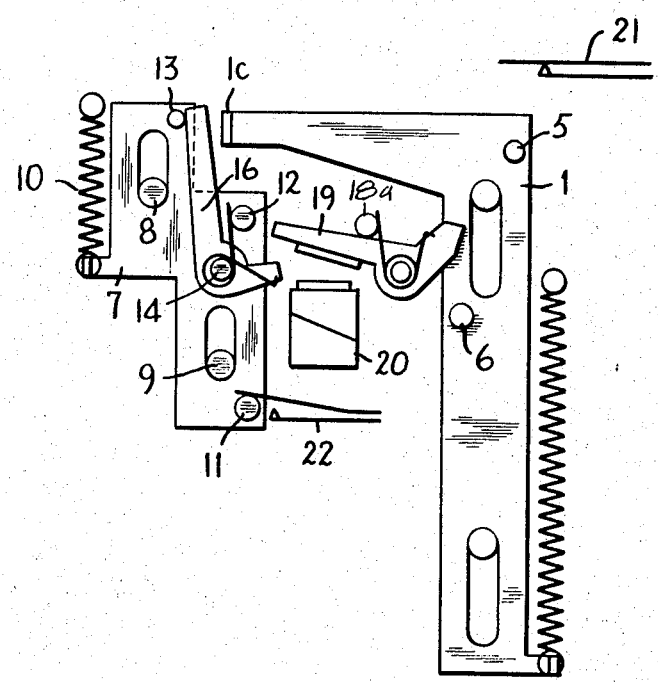
FIG. 2 shows the mechanism in the state after a release operation when the brightness of the subject being photographed exceeds a predetermined value.
Figure 3:
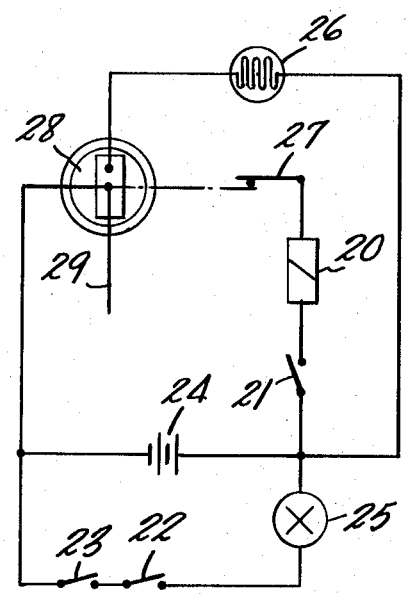
FIG. 3 is a circuit diagram of the control circuit including a brightness-detecting device and a current-responsive device controlling the coupling of the change over member with the release member according to the brightness of the subject.
Figure 4:
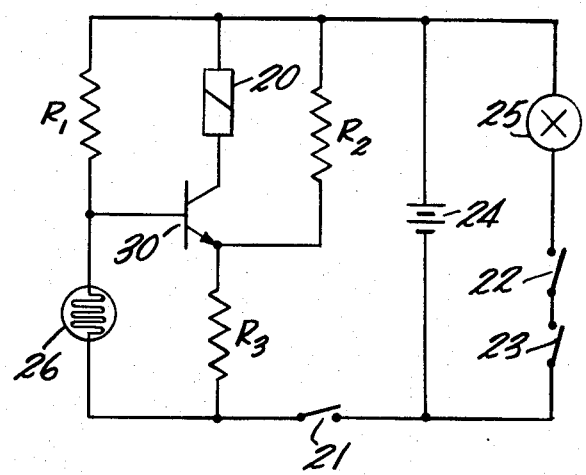
FIG. 4 is a circuit diagram of a transistorized control circuit.
Figure 5:
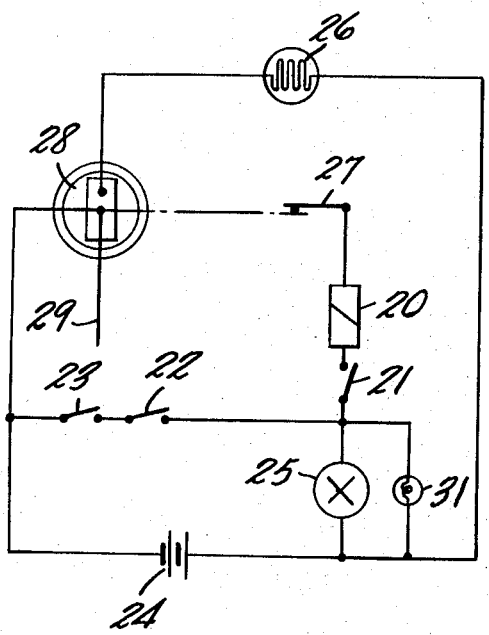
Figure 6:
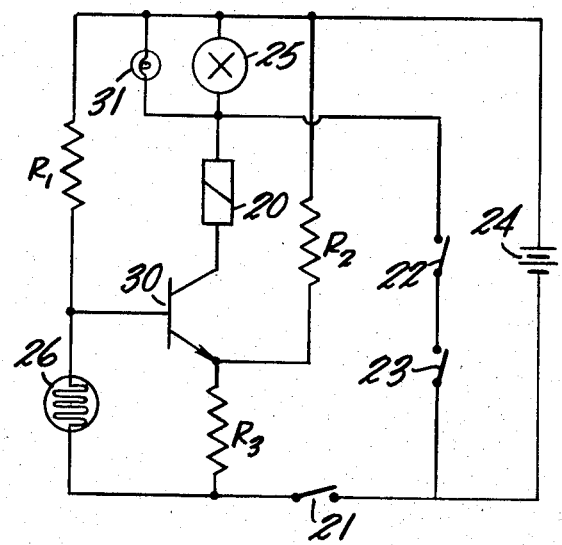

FIG. 5 and 6 are circuit diagrams of control circuits basically similar to those of FIGS. 3 and 4 but including means for preventing changeover to flashlight photography when the flashing device is not in operative condition and for indicating the inoperative condition of the flashing device In an embodiment of the invention illustrated in FIGS. 1 to 3, a release member 1 is supported for movement up and down by means of slots 1a and 1b slidably engaging fixedly positioned guide pins 2 and 3. The release member 1 is resiliently biased to its upper limit position by a tension spring 4. A pin 5 on the release member 1 operates and electric source switch 21 which will be referred to below and a pin 6 cooperates with an operating lever 19. A laterally projecting portion of the release member carries a bent part 1c which is adapted to engage an intermediate lever 16 as will be explained.

A changeover plate 7 is supported for up-and-down movement parallel to the release member 1 by means of grooves 7a and 7b slidable on fixed guide pins 8 and 9. The changeover plate is biased to its upper limit position by means of a tension spring 10. Through means not shown in the drawings the changeover plate 7 controls the changing of the camera mechanism from daylight exposure to flash operation. When the changeover plate 7 is in its upper position as shown in FIG. 1, the camera is set for daylight exposure which is automatically controlled in known manner according to the brightness of the subject being photographed. When the changeover plate 7 is moved downwardly, the camera is changed over to flashlight exposure which is likewise automatically controlled in known manner. A pin 11 on the changeover plate 7 operates a flash circuit switch 22 which will be referred to below.

Means is provided for selectively coupling the changeover member 7 with the release member 1 so as to move therewith when the latter is moved downwardly to effect a shutter release. The coupling means is shown as comprising the intermediate lever 16 which is pivotally mounted on the changeover plate 7 by means of a pivot pin 14 and biased to turn in a counterclockwise direction by a spring 15. Pivotal movement of the intermediate lever 16 is limited by pins 12 and 13 on the changeover plate 7. The intermediate lever 16 is generally L-shaped with an upper arm 16a and laterally projecting lower arm 16b. When the intermediate lever 16 is in its clockwise position limited by the pin 12 as shown in FIG. 1, the upper 16a is engageable by the bent part 1c of the release member 1 when the latter is moved downwardly so as to couple the changeover plate 7 to move downwardly with the release member. When the intermediate lever 16 is in its counterclockwise position limited by the pin 13 as shown in FIG. 2, the bent portion 1c of the release member 1 does not engage the lever 16 and hence the changeover plate 7 is not moved downwardly by the release member but remains in its upper position as shown in FIG. 2.

Means is provided for selectively disabling the means for coupling the changeover plate 7 with the release number 1 so that the changeover plate 7 will be coupled with the release member 1 so as to be moved downwardly to changeover position when conditions are appropriate for flash photography, the coupling means being disabled so as to leave the changeover plate in its upper position as shown in FIG. 2 when conditions are not appropriate for flash photography. The disabling means is illustrated as comprising the operating lever 19 which is pivotal about a fixed pivot 17 and is biased to turn in a clockwise direction by a spring 18. A fixed pin 18a limits the clockwise turning the lever 19. The lever 19 is provided with a bent part 19a which constitutes the armature of an electromagnet 20 which, when energized, holds the lever 19 in its counterclockwise position as shown in FIG. 1. In this position, an arm 19b of the lever 19 engages the arm 16b of the intermediate lever 16 to hold the latter in its clockwise position as illustrated in FIG. 1 so as to provide a coupling between the changeover plate 7 and the release member 1. When the operating lever 19 moves to its clockwise position as shown in FIG. 2, the intermediate lever 16 is rotated by the spring 15 to its counterclockwise position against the pin 13 as shown in FIG. 2 thereby disabling the coupling means between the changeover plate 7 and the release member 1. The operating lever 19 has a second arm 19c which is engageable by the pin 6 on the release member 1 to hold the operating lever 19 in its counterclockwise position when the release member 1 is in its upper rest position as shown in FIG. 1. When the release member 1 is moved downwardly, the operating lever 19 is released for rotation in a clockwise direction by its spring 18 unless the electromagnet 20 is energized so as to hold the operating lever 19 in its counterclockwise position by attraction of the armature portion 19a.

The electromagnet 20 is controlled in accordance with the brightness of the subject to be photographed so as to be energized to hold the operating lever 19 in operative position and thereby retain the intermediate lever 16 in active position to couple the changeover plate 7 with the release member 1 and thereby effect a changeover to flash photography when the brightness of the subject is below a predetermined value. A suitable control circuit as illustrated in FIG. 3 comprises a power source shown as a battery 24, a light-sensing unit 26 and a current-sensing device 28 responsive to the current flowing through the photosensitive element 26. The element 26 senses the brightness of the subject to be photographed and comprises a suitable photosensitive element, for example a photoresistor. The photosensitive unit may for example be CdS (cadmium sulfide) element. The current responsive device 28 is illustrated as an ammeter having a pointer 29 engageable with a stationary contact 27 when the current through the ammeter is below a predetermined value. The electromagnet 20 and electrical source switch 21 are connected in series with the battery 24 and the contacts 27,29 of the ammeter 28. As seen in FIGS. 1 and 2, the electric source switch 21 is operated by the pin 5 on the release member 1 so as to be open when the release member in its upper rest position as shown in FIG. 1 and closed when the release member moves downwardly as illustrated in FIG. 2. A suitable flashing device 25, for example a flashbulb or electronic flash, is connected to the battery 24 by the flash circuit switch 22 and a synchroswitch 23. The switch 22 is operated by the pin 11 on the changeover plate 7 (FIGS. 1 and 2) in the manner that the switch is open when the changeover plate 7 is in its upper rest position and is closed when the plate 7 moves downwardly to effect a changeover to flash photography. The synchroswitch 23 is operated in known manner by the shutter mechanism so as to be closed when the shutter is open.

The operation of the mechanism and the control circuit will be described. The shutter release mechanism of the camera is actuated by downward movement of the release member 1 form the upper rest position shown in FIG. 1 to the lower position as shown in FIG. 2. When the brightness of the subject to be photographed is below a predetermined value, the current flowing through the photosensing element 26 and hence through the ammeter 28 is small so that the movable contact 29 engages the fixed contact 27. Hence as the release member 1 moves downwardly so as to close the electric source switch 21, the electromagnet 20 is energized so as to hold the operating lever 19 in the operative position as shown in FIG. 1 and thereby retain the intermediate lever 16 in active position. As the release member 1 continues to move downwardly, the bent part 1c of the release member engages the arm 16a of the intermediate lever 16 so that the changeover plate 7 is coupled with the release member 1 and is thereby moved downwardly to effect a changeover to flash photography. As the changeover plate 7 moves downwardly, the switch 22 of the flash circuit is closed and when the shutter is opened the synchroswitch 23 is likewise closed to effect a flashing of the flashbulb or other flash device 25. The flash exposure is automatically adjusted in known manner according to the film rating, the intensity of the flashing device and the distance to the subject.

When the brightness of the subject is higher than the preselected value, the deflection of the movable contact 29 of the ammeter 28 is large so that the movable contact does not engage the stationary contact 27. The electromagnet 20 is hence not energized even when the switch 21 is closed. Thus, as soon as the release member 1 moves downwardly sufficiently for the pin 6 to clear the arm 19c the operating lever 19 is moved clockwise by its spring 18. This releases the intermediate lever 16 so that it is swung counterclockwise by its spring 15 to the position shown in FIG. 2, thereby disabling the coupling means. As the release member 1 continues its downward movement, the bent part 1c does not engage the intermediate lever 16 and hence the changeover plate 7 remains in its upper position for daylight exposure.

In FIG. 4 there is shown a transistorized control circuit for the mechanism illustrated in FIGS. 1 and 2. In the embodiment of FIG. 4 a standard resistance $R_1$ and a photoresistor, for example a CdS element 26, are connected in parallel to the electric source 24 through the electric source switch 21. Terminals of the standard resistance $R_1$ and the CdS element 26 are connected to the base of transistor 30. The collector of the transistor 30 is connected to the positive pole of the electric source 24 through the electromagnet 26 and the emitter of the transistor 30 is connected to the negative pole of the electric source 24 through a resistance $R_3$ and the electric source switch 21. The emitter of the transistor is also connected to the positive pole of the electric source through a resistance $R_2$. The flashbulb or other flashing device 25 is connected to the electric source through the flash circuit switch 22 and synchroswitch 23 connected in series.

With the circuitry shown in FIG. 4, the resistance of the photoresistor 26 and hence the brightness of the subject to be photographed determines whether or not the transistor 30 is conductive. When the brightness of the subject is low and hence the resistance of the photoresistor 26 is high, the transistor 30 becomes conductive so as to cause electric current to flow through the electromagnet 20 and thereby retain the operating lever 19 in operative position as shown in FIG. 1 so that upon downward movement of the release member 1 the changeover plate 7 is coupled to the release member so as to effect a change to flash photography. The flashing device is actuated by the closing of switches 22 and 23 as described above. When the brightness of the subject is greater than a selected value and hence the resistance of the photoresistor 26 is low, the transistor 30 remains nonconductive so that the electromagnet 20 is not energized and hence, as explained above, the means for coupling the changeover plate 7 to the release member 1 is disabled. The camera thus remains in condition to make a daylight exposure, the exposure being automatically adjusted in accordance with the brightness of the subject in known manner. The resistances in the circuit shown in FIG. 4 are selected in accordance with the characteristics of the photoresistor 26 to determine the value of brightness of the subject at which a changeover to flash photography is effected.

In FIG. 5 there is shown a control circuit which is similar to that of FIG. 3, corresponding parts being designated by the same reference numerals as in FIG. 3. However, it will be noted that the flashbulb 25 is connected in series with the electromagnet 20. If no flashbulb is placed in the socket or if the flashbulb in the socket is a used one or is defective, the electromagnet 20 is not energized sufficiently to hold the operating lever 19 in operative position even though the switch 21 and the contacts 27,29 are closed. Hence, if the brightness of the subject to be photographed is below the selected level so as to close the contacts 27,29 but the flash device 26 is not in operative condition, the operating lever 19 moves clockwise and the intermediate lever 16 is permitted to move counterclockwise so that the changeover plate is not coupled to the release member 1. The camera thus remains in condition for daylight exposure which is automatically adjusted for the available light. An indicating device shown as a pilot lamp 31 connected in parallel with the flashbulb 25 is illuminated when the switch 21 and the contacts 27,29 are closed so as to indicate that the flash device is not in operative condition. The resistance of the pilot lamp 31 is sufficiently high that current flowing through it is not sufficient to energize the electromagnet 20 to hold the operating lever 19 in operation position.

In FIG. 6 there is shown a transistorized control circuit similar to that of FIG. 4, corresponding parts being designated by the same reference numerals as in FIG. 4. It will be seen that as in FIG. 4, the flashbulb 25 is connected in series with the electromagnet 20 so that in the event there is no flashbulb in the socket or the flashbulb is a used one or is defective, the electromagnet 20 is not energized sufficiently to attract and hold the operating lever 19. Likewise, as in FIG. 5, and indicating device shown as a pilot lamp 31 is connected in parallel with the flashbulb 25 so as to indicate that the flashbulb is not in operative condition and hence does not change to flash photography even though the brightness of the subject to be photographed is below a predetermined value.

In accordance with the invention it is possible to reduce the force required for operating the release member in daylight photography, which is most frequently used. Moreover, even though the operating speed of the release lever is high, the changeover to the exposure control for flashlight photography is effected reliably when the brightness of the subject to be photographed is below a predetermined value. Since the changeover is controlled by means of an electromagnet connected to the brightness-sensing device, the required mechanism is simplified and reliability of operation is enhanced. Moreover, with the control circuits shown in FIGS. 5 and 6 the automatic changeover to flash photography can occur only when the flashing device is in operative condition. If no flashbulb has been supplied or if the flashbulb is used one or defective, a changeover to flashlight photography does not occur even though the brightness of the subject is below the predetermined value. Hence when the flashing device is inoperative, the exposure is made with available light. In a camera in which the exposure is automatically controlled according to the brightness of the subject, a satisfactory photograph can be made even when the brightness of the subject is below normal changeover value, provided that the camera is held steady. When the brightness of the subject is below a predetermined value but changeover is not effected by reason of the flashing device not being in operative condition, the pilot lamp illustrated in the circuits of FIGS. 5 and 6 gives an indication that the flashing device is not operative.

What I claim and desire to secure by letters patent is:

1. In shutter release mechanism of a camera having provision for flash photography, the combination of a movably release member, a movable changeover member operable to change from daylight exposure to flash exposure, means for sensing the brightness of a subject to be photographed, means for coupling said changeover member to said release member to move therewith and means connected with and responsive to said sensing means for disabling said coupling means when the brightness of said subject as sensed by said sensing means is above a predetermined value, whereby said changeover member is coupled to said release member by said coupling means and thereby movable by said release member to effect a changeover form daylight exposure to flash exposure when the brightness of said subject as sensed by said sensing means is less than said predetermined value.

2. Shutter release mechanism according to claim 1, in which said coupling means comprises a lever pivotally mounted on one of said members and having a portion engageable by the other of said members to couple said members when said coupling means is not disabled, said lever being swingable about said portion is not engageable by said other member.

3. Shutter release mechanism according to claim 2, in which said disabling means comprises a second lever swingable about a pivot and engageable with said first-mentioned lever to swing said first-mentioned lever between an active position in which said portion is engageable by said other member to couple said members and a disabled position.

4. Shutter release mechanism according to claim 3, further comprising an electromagnet for controlling the position of said second lever, said electromagnet being connected with and controlled by said sensing means.

5. Shutter release mechanism according to claim 1, in which a flashing device is connected in circuit with said sensing means and said disabling means in the manner that said disabling means is operative to disable said coupling means when the brightness of said subject is above said predetermined value and whenever said flashing device is in inoperative condition.

6. Shutter release mechanism according to claim 5, further comprising an indicating device connected with said flashing device to indicate whether said flashing device is in operative condition.

7. In shutter release mechanism of a camera having provision for flash photography, the combination of a movable release member, a movable changeover member operable to change from daylight exposure to flash exposure, means for coupling said changeover member to said release member to move therewith, said coupling means comprising a first lever pivoted on said changeover member and movable between an active position in which it couples said changeover member with said release member and a disabled position in which said members are not coupled, means for disabling said coupling means, said disabling means comprising a second lever swingable about a pivot between an operative position in which it holds said first lever in active position and a disabling position in which it permits movement of said first lever to disabled position, means comprising an electromagnet for holding said second lever in operative position and circuit means comprising said electromagnet, means comprising said electromagnet, means for sensing the brightness of a subject to be photographed, and means for energizing said electromagnet when the brightness of said subject is below a predetermined value to retain said second lever in operative position and said first lever in active position to couple said members and thereby operate said changeover member to change from daylight to flash exposure.

8. Shutter release mechanism according to claim 7, in which said means for energizing said electromagnet comprises a current-measuring device responsive to current through said brightness-sensing means.

9. Shutter release mechanism according to claim 7, in which said means for energizing said electromagnet comprises a transistor controlled by said brightness-sensing means.

10. Shutter release mechanism according to claim 7, in which said circuit means comprises a flashing device and means for energizing said electromagnet when said flashing device is in operative condition.

11. Shutter release mechanism according to claim 10, in which said circuit means further comprises indicating means for indicating when said flashing device is not in operative condition.

* * * * *